United States Patent

Koehler et al.

[15] 3,691,244

[45] Sept. 12, 1972

[54] MANUFACTURE OF 1-METHYL-3-PHENYLINDANES

[72] Inventors: Waldemar Koehler, 7 An der Froschlache; Hans-Georg Schecker, 6 Obersternstrasse, both of 6700 Ludwigshafen, Germany

[22] Filed: Nov. 25, 1970

[21] Appl. No.: 92,948

[30] Foreign Application Priority Data

| Nov. 28, 1969 | Germany | P 19 59 707.0 |
| July 10, 1970 | Germany | P 20 34 243.2 |
| July 10, 1970 | Germany | P 20 34 244.3 |
| July 11, 1970 | Germany | P 20 34 531.7 |

[52] U.S. Cl. .......................... 260/668 F, 260/669 P
[51] Int. Cl. ............................................. C07c 15/06
[58] Field of Search .................... 260/668 F, 669 P

[56] References Cited

UNITED STATES PATENTS

| 2,249,987 | 7/1941 | Stanley et al. | 260/668 F |
| 3,385,905 | 5/1968 | Smith et al. | 260/669 P |
| 2,646,450 | 7/1953 | Thurber | 260/668 F |

OTHER PUBLICATIONS

Volkov et al., Chem. Abs., 65, 7278c, 1966
Barton et al., J.C.S., May 1964 pp. 1573–80
Mayo, J.A.C.S. 90, 5, Feb. 28, 1968, pp. 1289–95

*Primary Examiner*—Curtis R. Davis
*Attorney*—Johnston, Root, O'Keeffe, Keil, Thompson & Shurtleff

[57] ABSTRACT

Manufacture of 1-methyl-3-phenylindanes by reacting gaseous styrene or 1,3-diphenylbutenes-1 in the presence of acids.

The compounds produced by the process of the invention are valuable intermediates in the manufacture of dyes and pesticides.

16 Claims, No Drawings

MANUFACTURE OF 1-METHYL-3-PHENYLINDANES

This invention relates to a process for the manufacture of 1-methyl-3-phenylindanes by reacting gaseous styrenes or 1,3-diphenylbutenes-1 in the presence of acids.

It is known to dimerize styrene in liquid form in the presence of phosphoric acid or sulfuric acid at elevated temperature to form a mixture of 1,3-diphenylbutene-1 and 1-methyl-3-phenylindane (Journal of Organic Chemistry, Vol. 19 (1954), pp. 17 ff. and Vol. 27 (1962), pp. 1636 ff.; Journal of the Chemical Society 1964, pp 1573 ff.; Organic Synthesis, Coll. Vol. IV, pp. 665 ff.). The reaction constitutes a complicated system of sidereactions and secondary reactions. The first reaction step is the dimerization of styrene monomer to 1,3-diphenylbutene-1 in the form of its structural cis and trans isomers. This is followed by the secondary reaction involving the cyclization of the trans form to the indane. The cis and trans forms are intermediates in the formation of trimers and higher polymers of styrene and thus give further undesirable by-products.

All of the said processes conducted in the liquid phase and at temperatures below 145° C are uneconomical to run on an industrial scale. The rate at which the styrene is dimerized is dependent on the temperature at which the reaction is carried out, on the concentration of the acid, on the ratio of acid to organic phase by volume, and on the vigor with which the two phases are interdispersed. The energy consumed in effecting adequate mixing is considerable and the use of stirrers gives rise to serious corrosion problems. At high reaction rates (space-time yields of up to 1.4 kg of indane per liter of reaction space per hour), product yields of only up to 30 percent of theory (based on styrene used) are obtained, while at low reaction rates the yields are higher, that is up to 80 percent of theory, but only low space-time yields of about 0.01 kg per liter per hour are obtained.

It is an object of the present invention to provide a new process for the manufacture of 1-methyl-3-phenylindanes in a simpler and more economical manner giving better yields and higher space-time yields of products of high purity.

In the dimerization of styrene and substituted styrenes, 1,3-diphenylbutenes-1 are frequently formed in considerable amounts in addition to the corresponding indanes. The substituted indanes are important intermediates, for example for the preparation of anthraquinone and substituted anthraquinones. It is therefore desirable to convert 1,3-diphenylbutenes-1 obtained as by-products to the corresponding indanes by subsequent cyclization. It is known that 1,3-diphenylbutene-1, the linear styrene dimer, may be isomerized to the cyclic 1-methyl-3-phenylindane using catalysts such as aluminum silicate, phosphoric acid (100 percent), polyphosphoric acid, and phosphoric acid absorbed on active carbon, although this reaction is not specific when conducted under the conditions stated, since a considerable quantity of higher linear styrene polymers is also obtained (Journal of Organic Chemistry 27 (1962), pp. 1636 ff.). It is also known that the cyclization reaction may also be carried out in the presence of 62 percent sulfuric acid, the two-phase reaction mixture being stirred for about 12 hours at 150° C (Rabjohn, Organic Synthesis, Coll. Vol. IV, (John Wiley, N.Y.) pp. 665 ff.). None of these processes is satisfactory either economically on an industrial scale or in respect of the space-time yields obtained.

We have now found that 1-methyl-3-phenylindanes of the general formula:

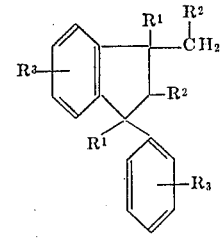

I in which $R^1$, $R^2$ and $R^3$ are identical or different and each denotes alkyl or a hydrogen atom and $R^3$ may also denote a halogen atom, are advantageously produced by carrying out the reaction using gaseous styrenes of the general formula:

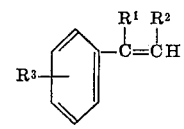

II or using 1,3-diphenylbutenes-1 of the general formula:

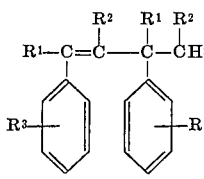

III in which formulas $R^1$, $R^2$ and $R^3$ have the meanings given above, in the presence of phosphoric acid, sulfuric acid and/or haloalkanecarboxylic acids in liquid form at a temperature above 150° C, or using 1,3-diphenylbutenes-1 of the general formula:

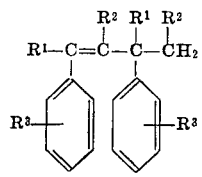

III in which $R^1$, $R^2$ and $R^3$ have the meanings given above, at a temperature of from 100° to 150° C in the presence of a mixture of phosphoric acid, sulfuric acid and water, said mixture comprising 79–10 percent by weight of phosphoric acid as phosphorus pentoxide, 1–60 percent by weight of sulfuric acid and 20–30 percent by weight of water.

The conversion may be represented by the following formulas illustrating the use of styrene and 1,3-diphenylbutene-1 respectively:

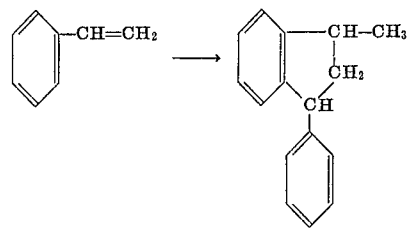

2

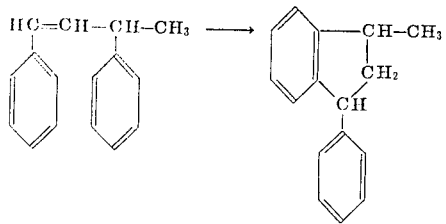

In comparison with prior art processes the process of the invention provides 1-methyl-3-phenylindanes in a simpler and more economical manner giving better yields and space-time yields of product of high purity. It is possible to achieve product yields of from 65–80 percent of theory based on styrene converted, at space-time yields of from 1 to 3 kg per liter of reaction space per hour.

The starting materials of formula II are in the gaseous state throughout the reaction. Preferred starting materials of the general formulas II and III and therefore preferred products of formula I and those in whose formulas $R^1$, $R^2$ and $R^3$ are identical or different and each denotes alkyl of from one to four carbon atoms or a hydrogen atom and $R^3$ may also denote a chlorine or bromine atom. Suitable starting materials are, for example, styrene, o-chlorostyrene, p-bromostyrene p-methylstyrene, α-methylstyrene, β-propylstyrene, α,β-dimethyl-styrene, α-isobutylstyrene, 1,3-diphenylbutene-1, di-o-chloro-1,3-diphenylbutene-(1), di-p-bromo-1,3-diphenylbutene-(1), di-p-methyl-1,3-diphenybutene-(1), 1,3-diemthyl--dimethyl--diphenylbutene-1, 2,4-di-propyl-1,3-diphenyl-butene-1, 1,2,3,4-tetramethyl-1,3-diphenylbutene-1 and 1,3-diisobutyl-1,3-diphenylbutene-1. Mixtures of starting material III and product I, such as are obtained in the manufacture of product I from styrene, are also suitable.

The acids used are phosphoric acid, sulfuric acid and/or haloalkanecarboxylic acids, preferably in a ratio of from 50 to 1,000, in particular from 100 to 500, moles of acid (calc. as 100 percent) per mole of starting material II. The acids may be used either in concentrated form or in admixture with water. Specific examples of suitable acids are metaphosphoric acid, pyrophosphoric acid or, in particular, orthophosphoric acid, preferably in the form of an aqueous solution containing from 50 to 95 percent by weight of phosphoric pentoxide, in the case of starting material II from 50 to 90 percent by weight and preferably from 60 to 80 percent by weight of phosphorus pentoxide, and in the case of starting material III from 75 to 95 percent by weight and preferably from 76 to 85 percent by weight of phosphorus pentoxide. Other suitable acids are aqueous 50–80 wt percent sulfuric acid, mono-, di- and trichloro-acetic acids and chloropropionic acid.

The reaction is carried out continuously or batchwise at a temperature above 150° C, usually at a temperature of from 150° to 280° C, in the case of starting material II advantageously from 150° to 250° C, preferably from 150° to 200° C, and in the case of starting material III advantageously from 150° to 280° C, preferably from 170° to 250° C, at subatmospheric or superatmospheric pressure, for example at from 0.3 to 30 atmospheres, in particular from 0.5 to 1.5 atmospheres, or, preferably, at atmospheric pressure.

The temperature is adjusted according to the pressure used so that the starting material II used in the reaction remains in the gaseous state throughout. If necessary, organic solvents which are inert under the conditions of the reaction may also be used, for example aliphatic hydrocarbons such as n-pentane and n-heptane, cycloaliphatic hydrocarbons such as cyclohexane, or mixtures thereof. Nitric oxide, advantageously in an amount of up to 2 percent by weight based on starting material II, may also be added to the reaction mixture to improve the purity of the product by substantially preventing side-reactions (polymerizations).

When the reaction is effected using gaseous starting materials of formula III in the presence of phosphoric acid, it is preferred to use a reaction pressure of from 15 to 500 mm, especially from 20 to 200 mm of Hg. If the starting material of formula III is reacted in the liquid state, it is advantageous to use, as catalysts, phosphoric acid containing from 75 to 85 percent by weight, preferably from 77 to 82 percent by weight, of phosphorus pentoxide, or 68–75 wt percent sulfuric acid or mixtures of phosphoric acid, sulfuric acid and water in a ratio by weight of $P_2O_5 : H_2SO_4 : H_2O$ of from 79:1:20 to 10:60:30, preferably of from 60:16:24 to 20:52:28. When phosphoric acid is used, the reaction temperature is advantageously between 170° and 220° C, in particular between 180° and 210° C. When sulfuric acid is used the reaction temperature is advantageously between 150° and 180° C, preferably between 160° and 170° C. When mixtures of sulfuric acid and phosphoric acid are used, the temperature at which the reaction is carried is advantageously between 150° and 180° C, preferably between 150° and 160° C. Phosphoric acid is advantageously used in an amount of from 10 to 1,000, in particular from 50 to 200 percent by volume of acid (calc. as 100 percent) based on starting material III.

The reaction of starting material III is also advantageously carried out at a temperature between 100° and 150° C in the presence of a mixture of phosphoric acid, sulfuric acid and water, said mixture comprising from 79 to 10 percent by weight of phosphorus pentoxide, from 1 to 60 percent by weight of sulfuric acid and from 20 to 30 percent by weight of water. This reaction is preferably carried out at a temperature between 120° and 150° C, either continuously or batchwise. Preferred acid mixtures contain from 64 to 20 percent by weight of phosphorus pentoxide, from 16 to 52 percent by weight of sulfuric acid and from 20 to 28 percent by weight of water. In the above ratios sulfuric acid is calculated as being 100 percent. Advantageously, the acid mixture is used in a ratio of from 4.0 to 0.25, preferably from 2.0 to 0.5, parts by volume of acid mixture per part by volume of starting material III.

The reaction may be carried out as follows. The reactor may be any apparatus in which the gaseous styrene is efficiently contacted with the acid phase, for example a bubbler, a cascade reactor, a packed volumn, an Oldershaw column or columns fitted with sieve plates, glass trays, bubble-cap trays or valve trays. The gaseous styrene is dimerized in the reactor at the reaction temperature flowing with or against the stream of acid. If the type of reactor used permits, the acid may be placed in the reactor and the gaseous styrene passed through, provision being made for thorough mixing of the two phases.

Where columns are used, the acid is passed through the reactor continuously, liquid throughputs of from 10 to 100 m³ per m² of column cross-section per hour being desirable. On leaving the reactor, the acid may be freed from organic reaction product and then recycled to the reactor. The velocity of the gaseous styrene is from 0.1 to 2.0 m/sec based on the cross-section of the column. The residence time in the reactor is usually from 0.1 to 5 minutes. In a separating plant arranged downstream of the reactor, the reaction mixture is freed from acid and the product is isolated in the usual way, for example by fractional distillation. Unreacted starting material and the acid are recycled to the reaction. It will generally be advantageous to feed the starting material to the reactor in the gas phase, but it is also possible to feed it to the reactor in the liquid state and then vaporize it in the reactor, after which it is contacted with the acid, the reaction thus being started. In a preferred embodiment of the process of the invention use is made of an apparatus in which the styrene is vaporized in vacuo so as to minimize the rate of thermal polymerization. The styrene is then compressed under the conditions of the reaction. A jet pump is advantageously used which is operated with phosphoric acid as the liquid medium, at the reaction temperature, and which sucks in the styrene at subatmospheric pressure and then compresses the mixture. The two-phase reaction mixture leaving the jet pump is then passed to a reactor where the reaction is carried out as described above.

The continuous reaction of starting materials of formula III is carried out in a similar manner.

The reaction involving starting materials of formula II may also be carried out using any desired batchwise mode of operation. For economical reasons, the reaction is advantageously carried out in a distillation column with thorough mixing, the reaction mixture being allowed to distil off gradually at the reaction temperature. Suitable columns are, for example packed columns, Oldershaw column, or columns fitted with sieve plastes, glass trays, bubble-cap trays, valve trays or rotating baffles. In such cases it is convenient to operate at subatmospheric pressures, for example at pressures above 20 mm Hg, preferably between 20 and 100 mm Hg, and/or, where phosphorus acid is used as catalyst, at a ratio of 0.001 to 2 parts by volume of phosphoric acid per part by volume of starting material of formula III. When the starting material consists of a mixture of starting material III and product I the same volumetric ratio is advantageous with reference to the volume of the mixture.

The reaction involving starting material III may also be carried out in a stirred vessel or in a cascade of such vessels, for example at a pressure of from 0.3 to 3 atmospheres during from 30 to 90 minutes. If a cascade of stirred vessels is used, the individual vessels may differ as regards size, reaction temperature and the concentration of the acid in the vessel. In this case it is advantageous to use a ratio by volume of phosphoric acid to starting material III of from 1 to 0.25 : 4. On completion of the reaction, it is advantageous to separate the acid from the organic phase in the two-phase mixture and to re-use the acid after purifying it, for example by filtration, centrifuging, distillation or extraction. The product is removed from the organic phase by a conventional method, for example by distillation.

The compounds produced by the process of the invention are valuable starting materials for the manufacture of dyes and pesticides. In this connection, reference is made to the aforementioned publications and to German Patents . . . (German Application Pat. No P 19 34 086.4), . . . (German Application Pat. No. P 19 34 055.7) and . . . (German Application Pat. No. P 19 15 385.6).

The invention is illustrated by the following Examples, in which parts are by weight.

EXAMPLE 1

A column is used which is equipped with external heating and packed with Raschig rings, 98 wt percent phosphoric acid being circulated therethrough. The phosphoric acid flows through the column in the same direction as the styrene. The temperature of the phosphoric acid in the column is 162° C and the rate of circulation 15 parts per hour.

The feed to the column consists of gaseous styrene obtained by vaporizing 0.540 parts per hour or liquid styrene at atmospheric pressure in the presence of 0.01 part of nitric oxide.

A 94 percent conversion of the styrene is achieved in a single pass through the column. In a separating vessel downstream of the column, the reaction mixture is freed from phosphoric acid and fractionally distilled. There are thus obtained:

0.366 parts of 1-methyl-3-phenylindane (72 percent of theory), b.p. 150° C/6.5 mm;

0.065 parts of 1,3-diphenylbutene-1 (12.8 percent of theory), b.p. 164° C/6.5 mm;

0.077 parts of higher linear styrene polymers (15.1 percent of theory).

The space-time yield, based on the colume of the empty column, is 1.2 kg per liter per hour.

EXAMPLE 2

Using the general procedure described in Example 1, 0.740 parts of gaseous styrene per hour are dimerized, the temperature of the circulating phosphoric acid being 155° C (rate of circulation 20 parts per hour). An 88 percent conversion of the styrene is achieved. There are thus obtained:

0.444 parts of 1-methyl-3-phenylindane (68.2 percent of theory) b.p. 150° C/6.5 mm;

0.093 parts of 1,3-diphenylbutene-1;

0.114 parts of higher linear styrene polymers.

The space-time yield is 1.5 kg of product per liter per hour.

EXAMPLE 3

In an externally heated column packed with Raschig rings gaseous 1,3-diphenylbutene-1 (3.5 parts per hour) is passed countercurrently to phosphoric acid (calc. 110% $H_3PO_4$) heated at 200° C (rate of circulation 100 parts per hour) at a pressure of 20 mm of Hg. A 30 percent conversion of the 1,3-diphenylbutene-1 is achieved at a residence time of 2 seconds. The reaction temperature is 200° C. The effluent gas mixture comprising the linear and cyclic dimers is condensed. There are thus obtained, per hour, based on 1,3-diphenylbutene-1 converted:

0.91 parts of 1-methyl-3-phenylindane (86.4 percent of theory), b.p. 150° C/6.5 mm;

0.14 parts of linear styrene polymers.

The acid and unreacted starting material are recycled for reuse in the reaction.

EXAMPLE 4

100 parts of a mixture of sulfuric acid and phosphoric acid (40 percent of $P_2O_5$, 35 percent of $H_2SO_4$ (calc. as 100 percent) and 25 percent of $H_2O$) and 50 parts of 1-methyl-3-phenylindane are placed in a stirred apparatus and 30 parts per hour of a mixture of 1,3-diphenylbutene-1 (20 percent by weight) and 1-methyl-3-phenylindane (80 percent by weight) are continuously fed to the apparatus. The reaction mixture is well stirred and maintained at a reaction temperature of 155° C. About 30 parts per hour of the organic phase of the reaction mixture together with about 55 parts per hour of the acid mixture are bled off to a separating vessel, where the acid separates as the lower phase. The acid is recycled to the reactor and the organic phase is fractionally distilled. A 96.5 percent conversion of the 1,3-diphenylbutene-1 is achieved in this reaction; there are thus obtained, based on 100 parts of converted 1,3-diphenylbutene-1:

87.3 parts of 1-methyl-3-phenylindane, b.p. 150° C/6.5 mm;

12.7 parts of higher styrene polymers.

EXAMPLE 5 a. A mixture of 83.5 percent by weight of 1-methyl-3-phenylindane, 14,5 percent by weight of 1,3-diphenylbutene-1 and 2 percent by weight of phosphoric acid (78 percent by weight of $P_2O_5$) is distilled in a packed column at a pressure of 50 mm Hg and at a reaction temperature of from 210° to 250° C in the body of the still. The temperature at the top of the column is not allowed to rise above 205° C. 420 parts of the mixture are fractionally distilled per hour, the volume of starting material distilled off from the column being continuously replenished. From 100 parts of starting mixture containing 83.5 percent by weight of 1-methyl-3-phenylindane and 14.5 percent by weight of 1,3-diphenylbutene-1 there are obtained:

97.7 parts of 1-methyl-3-phenylindane;

2.3 parts of higher styrene polymers.

This is equivalent to a yield of 84 percent based on 1,3-diphenylbutene-1 converted.

b 200 parts of phosphoric acid (79.6 percent of $P_2O_5$) and 200 parts of a mixture of 78 percent by weight of 1,3-diphenylbutene-1 and 22 percent by weight of 1-methyl-3-phenylindane are placed in a stirred vessel to which a column has been attached, and 100 parts per hour of the above mixture of dimers are fed to the vessel. The mixture is stirred continuously and 97.8 parts of mixture distil off per hour at a pressure of 20 mm Hg. The temperature of the still is 190°–195° C. The separated reaction mixture has the following composition:

76.7 parts of 1-methyl-3-phenylindane (= 92.6 percent of the converted linear dimers;

18.9 parts of 1,3-diphenylbutene-1;

2.2 parts of low-boiling by-products;

2.2 parts of residue comprising higher styrene polymers.

EXAMPLE 6

100 parts of a mixture of 1,3-diphenylbutene-1 (78 percent by weight) and 1-methyl-3-phenylindane (22 percent by weight) are thoroughly mixed with 197 parts of phosphoric acid (78.2 percent by weight of $P_2O_5$) in a stirred vessel for 1 hour at 196° C. The organic phase formed is then separated off and fractionally distilled. There are thus obtained:

93.0 parts of 1-methyl-3-phenylindane (91 percent of theory based on reacted starting material III), b.p. 150° C/6.5 mm;

3.2 parts of 1,3-diphenylbutene-1;

3.8 parts of higher styrene polymers.

EXAMPLE 7

100 parts of a mixture of 1,3-diphenylbutene-1 (78 percent by weight) and 1-methyl-3-phenylindane (22 percent by weight) are well stirred with 194 parts of phosphoric acid (67.9 percent of $P_2O_5$) in a stirred vessel for 1 hour at 210° C. The organic phase formed is then separated off and fractionally distilled. There are thus obtained:

62.4 parts of 1-methyl-3-phenylindane (91 percent of theory based on reacted starting material III), b.p. 150° C/6.5 mm;

9.4 parts of 1,3-diphenylbutene-1;

6.2 parts of higher styrene polymers.

EXAMPLE 8

100 parts of a mixture of 1,3-diphenylbutene-1 (78 percent by weight) and 1-methyl-3-phenylindane (22 percent by weight) are well stirred with 199 parts of phosphoric acid (79.7 percent of $P_2O_5$) in a stirred vessel for 1 hour at 182° C. The organic phase formed is then separated off and franctionally distilled. There are thus obtained:

60.0 parts of 1-methyl-3-phenylindane (95 percent of theory based on reacted starting material III), b.p. 150° C/6.5 mm;

14.8 parts of 1,3-diphenylbutene-1;

3.2 parts of higher styrene polymers.

EXAMPLE 9

Following the general procedure described in Example 6 100 parts of the mixture are, together with 160 parts of 70 percent w/w sulfuric acid, maintained at 150° C for 1 hour. There are thus obtained: 81 parts of 1-methyl-3-phenylindane (79.8 percent of theory based on reacted starting material III), 4.1 parts of 1,3-diphenylbutene-1;

14.9 parts of higher styrene polymers.

EXAMPLE 10

Following the general procedure described in Example 6, 100 parts of the mixture are maintained at 160° C together with 180 parts of a mixture of phosphoric acid and sulfuric acid consisting of 72 parts of $P_2O_5$, 63 parts of $H_2SO_4$ and 45 parts of $H_2O$.

A virtually 100 percent conversion of the starting material of formula III is achieved, 70.2 parts of product of formula I (90.0 percent of theory based on starting material of formula III) being obtained.

EXAMPLE 11

100 parts of a mixture of 1,3-diphenylbutene-1 (78 percent) and 1-methyl-3-phenylindane (22 percent) are well stirred for 1 hour with 180 parts of a mixture of phosphoric acid, sulfuric acid and water, this mixture comprising 40 percent of $P_2O_5$, 35 percent of $H_2SO_4$ (calc. as 100 percent) and 25 percent of $H_2O$, by weight, the temperature being 140° C. The organic phase is then separated from the acid and fractionally distilled. There are thus obtained 94.5 parts of 1-methyl-3-phenyl-indane (92.9 percent of theory based on reacted starting material III), b.p. 150° C/6.5 mm, the conversion of starting material III being virtually 100 percent.

We claim:

1. A process for the manufacture of 1-methyl-3-phenylindane of the general formula:

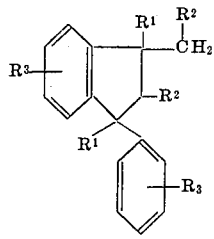

I in which $R^1$, $R^2$ and $R^3$ are identical or different and each denotes alkyl or a hydrogen atom and $R^3$ may also denote a halogen atom, which comprises dimerizing a gaseous styrene of the general formula:

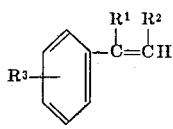

II in the presence of at least one of phosphoric acid, sulfuric acid and haloalkanecarboxylic acids in liquid form at a temperature above 150°C in which $R^1$, $R^2$ and $R^3$ have the meanings given above.

2. A process for manufacture of 1-methyl-3-phenylindane of the general formula:

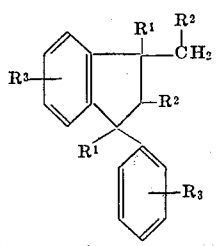

I in which $R^1$, $R^2$ and $R^3$ are identical or different and each denotes alkyl or a hydrogen atom and $R^3$ may also denote a halogen atom, which comprises cyclizing a 1,3-diphenylbutene-1 of the general formula:

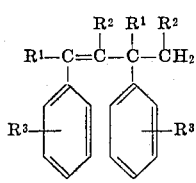

in which $R^1$, $R^2$ and $R^3$ have the meanings given above in the presence of at least one of phosphoric acid, sulfuric acid and haloalkanecarboxylic acids in liquid form at a temperature above 150° C.

3. A process as claimed in claim 2, wherein the reaction is carried out continuously.

4. A process for manufacture of 1-methyl-3-phenylindane of the general formula:

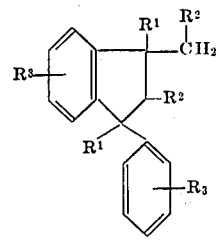

I in which $R^1$, $R^2$ and $R^3$ are identical or different and each denotes alkyl or a hydrogen atom and $R^3$ may also denote a halogen atom, which comprises cyclizing a 1,3-diphenylbutene-1 of the general formula:

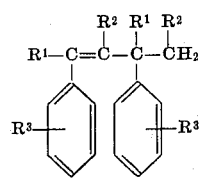

in which $R^1$, $R^2$ and $R^3$ have the meanings given above, at a temperature of from 100° to 150° C and in the presence of a mixture of phosphoric acid, sulfuric acid and water, said mixture comprising 79–10 percent by weight of phosphoric acid as phosphorus pentoxide, 1–60 percent by weight of sulfuric acid and 20–30 percent by weight of water.

5. A process as claimed in claim 1 wherein the reaction is carried out using from 100 to 500 moles of acid (calc. as 100 percent) per mole of starting material of formula II.

6. A process as claimed in claim 1 wherein the reaction is carried out using phosphoric acid in the form of an aqueous solution containing from 50–90 percent by weight of phosphoric acid as phosphorus pentoxide.

7. A process as claimed in claim 1 wherein the reaction is carried out using phosphoric acid in the form of an aqueous solution containing from 75 to 95 percent by weight of phosphoric acid as phosphorus pentoxide.

8. A process as claimed in claim 1 wherein the reaction is carried out at a temperature of from 150° to 200° C.

9. A process as claimed in claim 1, wherein the reaction is carried out at a temperature of from 170° to 250° C.

10. A process as claimed in claim 1 wherein the reaction is carried out in the presence of organic solvents which are inert under the reaction conditions.

11. A process as claimed in claim 4 wherein the reaction is carried out using an acid mixture composed of from 64 to 20 percent by weight of phosphoric acid as phosphorus pentoxide, from 16 to 52 percent by weight of sulfuric acid and from 20 to 28 percent by weight of water.

12. A process as claimed in claim 2 wherein the reaction is carried out using phosphoric acid in the form of an aqueous solution containing from 50–90 percent by weight of phosphoric acid as phosphorus pentoxide.

13. A process as claimed in claim 2 wherein the reaction is carried out using phosphoric acid in the form of an aqueous solution containing from 75 to 95 percent by weight of phosphoric acid as phosphorus pentoxide.

14. A process as claimed in claim 2 wherein the reaction is carried out at a temperature of from 150° to 200° C.

15. A process as claimed in claim 2, wherein the reaction is carried out at a temperature of from 170° to 250° C.

16. A process as claimed in claim 2 wherein the reaction is carried out in the presence of organic solvents which are inert under the reaction conditions.

* * * * *

PO-1050
(5/69)

UNITED STATES PATENT OFFICE
CERTIFICATE OF CORRECTION

Patent No. 3,691,244          Dated September 12, 1972

Inventor(s) Koehler et al

It is certified that error appears in the above-identified patent and that said Letters Patent are hereby corrected as shown below:

Cover page, left hand column, insert -- [73] ASSIGNEE: Badische Anilin-& Soda-Fabrik Aktiengesellschaft, Ludwigshafen am Rhein, Germany --

Signed and sealed this 17th day of April 1973.

(SEAL)
Attest:

EDWARD M. FLETCHER, JR.
Attesting Officer

ROBERT GOTTSCHALK
Commissioner of Patents